(12) United States Patent
Vijayasankar et al.

(10) Patent No.: US 11,368,190 B2
(45) Date of Patent: *Jun. 21, 2022

(54) BEACON-ENABLED COMMUNICATIONS FOR VARIABLE PAYLOAD TRANSFERS

(75) Inventors: Kumaran Vijayasankar, Dallas, TX (US); Ramanuja Vedantham, Allen, TX (US); Badri N. Varadarajan, Mountain View, CA (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1935 days.

This patent is subject to a terminal disclaimer.

(21) Appl. No.: 13/443,123

(22) Filed: Apr. 10, 2012

(65) Prior Publication Data

US 2012/0263189 A1 Oct. 18, 2012

Related U.S. Application Data

(60) Provisional application No. 61/476,648, filed on Apr. 18, 2011.

(51) Int. Cl.
*H04B 3/54* (2006.01)
*H04L 5/00* (2006.01)
*H04L 25/02* (2006.01)

(52) U.S. Cl.
CPC ........... *H04B 3/544* (2013.01); *H04L 5/0007* (2013.01); *H04L 5/0053* (2013.01); *H04L 25/0272* (2013.01)

(58) Field of Classification Search
CPC ..... H04B 3/544; H04L 5/0007; H04L 5/0053; H04L 25/0272
See application file for complete search history.

(56) References Cited

U.S. PATENT DOCUMENTS

| | | | |
|---|---|---|---|
| 7,058,074 B2* | 6/2006 | Ho et al. | 370/447 |
| 8,638,772 B2* | 1/2014 | Seok | 370/346 |
| 2002/0013897 A1* | 1/2002 | McTernan | H04L 12/1818 713/153 |
| 2002/0061031 A1* | 5/2002 | Sugar et al. | 370/466 |
| 2003/0169155 A1 | 9/2003 | Mollenkopf et al. | |

(Continued)

*Primary Examiner* — Gregory B Sefcheck
*Assistant Examiner* — Joshua Smith
(74) *Attorney, Agent, or Firm* — Brian D. Graham; Charles A. Brill; Frank D. Cimino

(57) ABSTRACT

Systems and methods for designing, using, and/or implementing beacon-enabled communications for variable payload transfers are described. In various embodiments, these systems and methods may be applicable to power line communications (PLC). For example, a method may include implementing a superframe having a plurality of beacon slots, a plurality of intermediate slots following the beacon slots, and a poll-based Contention Free Period (CFP) slot following the intermediate slots. Each of the beacon slots and each of the intermediate slots may correspond to a respective one of a plurality of frequency subbands, and the poll-based CFP slot may correspond to a combination of the plurality of frequency subbands. The method may also include receiving a poll request over a first of the plurality of frequency subbands during the poll-based CFP slot, and then transmitting a data packet over a second of the plurality of frequency subbands during the poll-based CFP slot.

23 Claims, 12 Drawing Sheets

FIG. 10A

(56) References Cited

U.S. PATENT DOCUMENTS

| | | | |
|---|---|---|---|
| 2004/0047319 A1* | 3/2004 | Elg | 370/338 |
| 2005/0085214 A1* | 4/2005 | Laroia | H04L 5/0039 |
| | | | 455/403 |
| 2005/0135318 A1* | 6/2005 | Walton | H04L 12/66 |
| | | | 370/338 |
| 2006/0050742 A1* | 3/2006 | Grandhi | H04B 7/0413 |
| | | | 370/506 |
| 2007/0058661 A1* | 3/2007 | Chow | H04L 12/417 |
| | | | 370/445 |
| 2007/0230497 A1 | 10/2007 | Choi et al. | |
| 2009/0067389 A1 | 3/2009 | Lee et al. | |
| 2009/0075664 A1* | 3/2009 | Palanki | H04L 5/0044 |
| | | | 455/446 |
| 2010/0296493 A1* | 11/2010 | Lee et al. | 370/336 |
| 2011/0026472 A1* | 2/2011 | Reumerman et al. | 370/329 |
| 2011/0038343 A1* | 2/2011 | Bhatti et al. | 370/330 |
| 2011/0110459 A1* | 5/2011 | Abraham | 375/295 |
| 2011/0235533 A1* | 9/2011 | Breit | H04L 1/0026 |
| | | | 370/252 |
| 2011/0268094 A1* | 11/2011 | Gong | H04L 1/1685 |
| | | | 375/260 |

\* cited by examiner

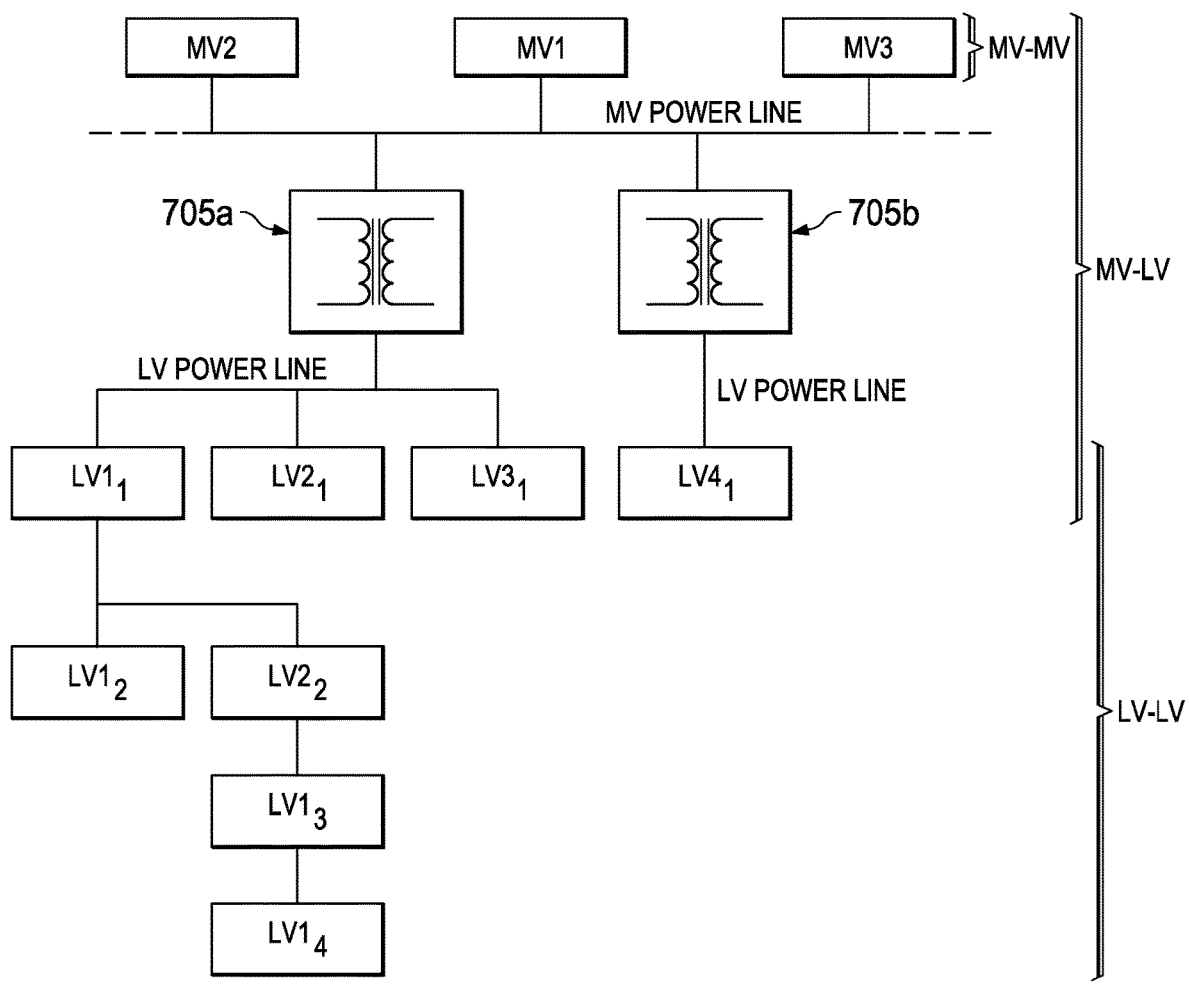

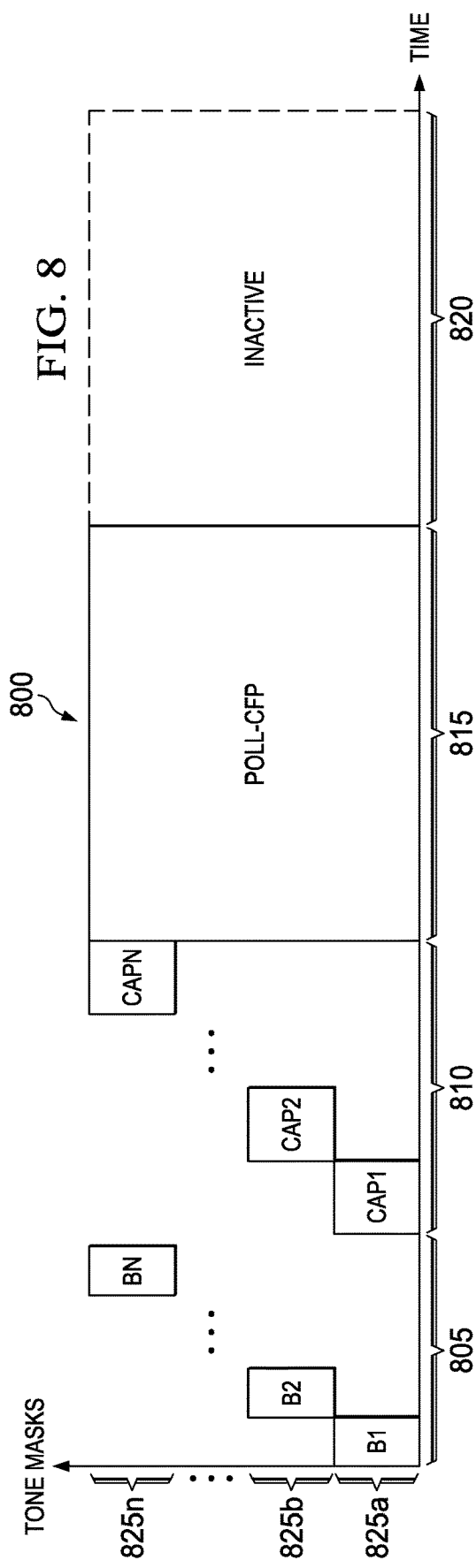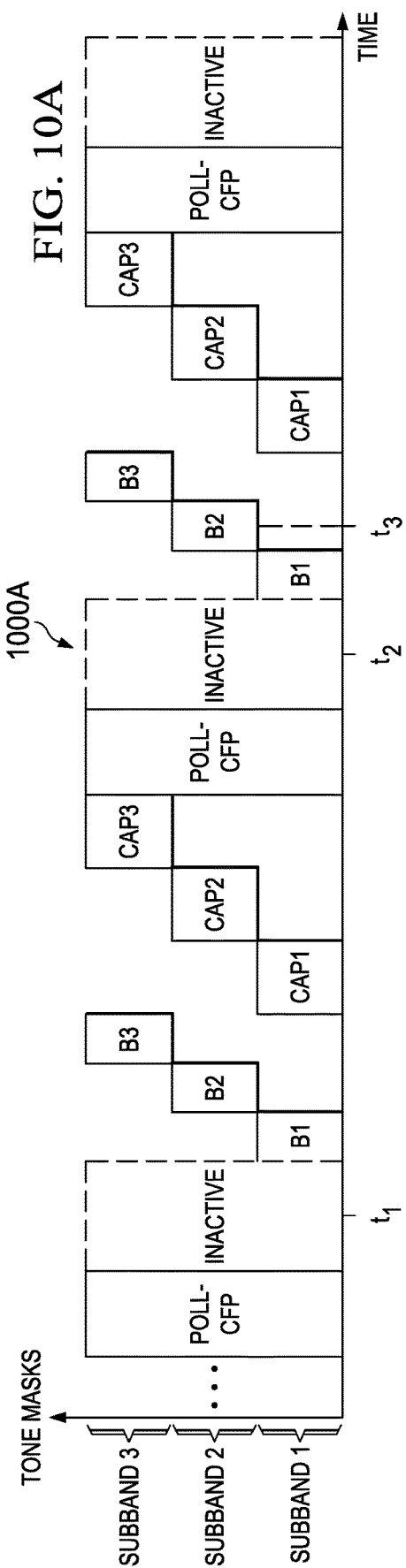

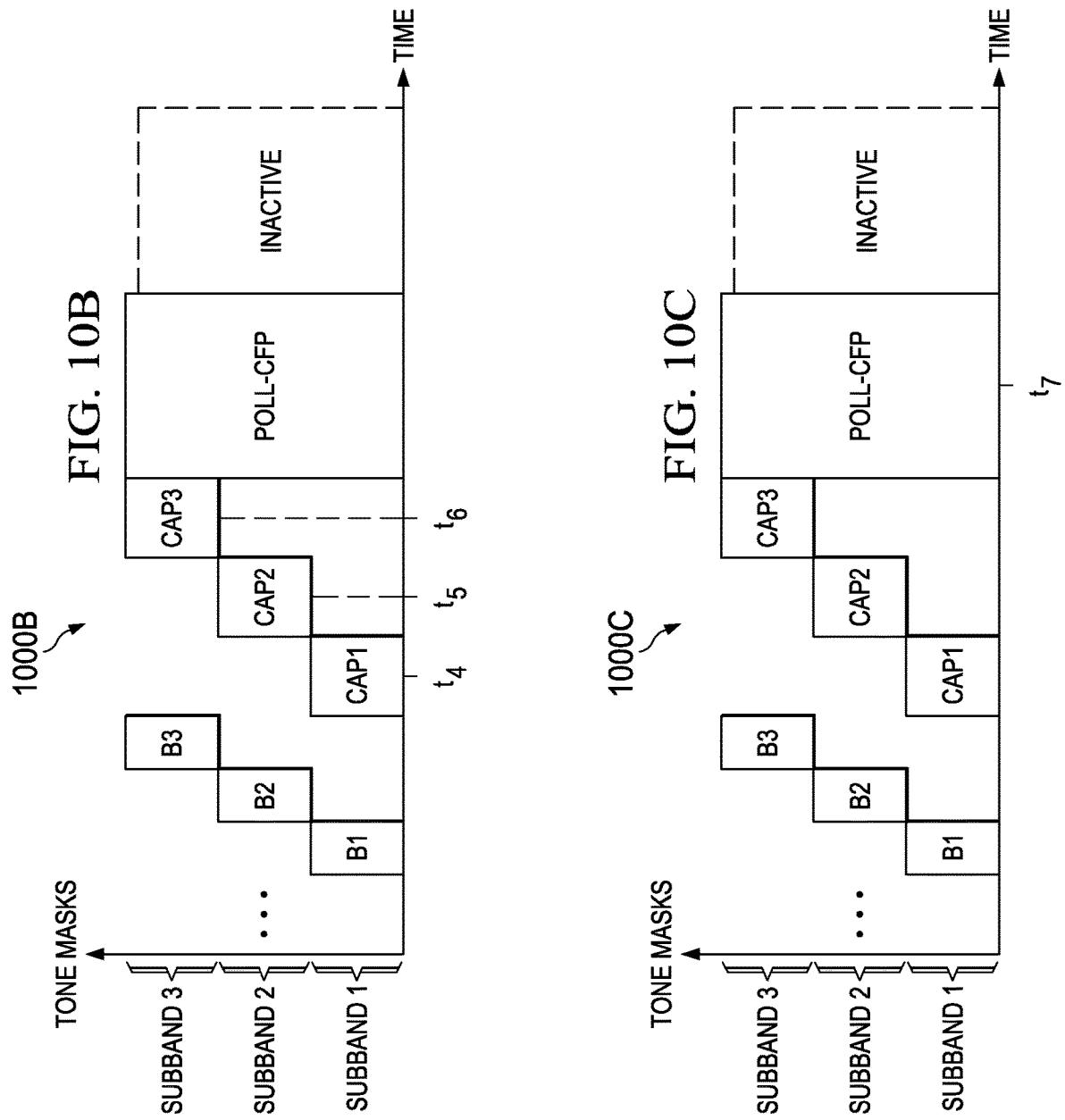

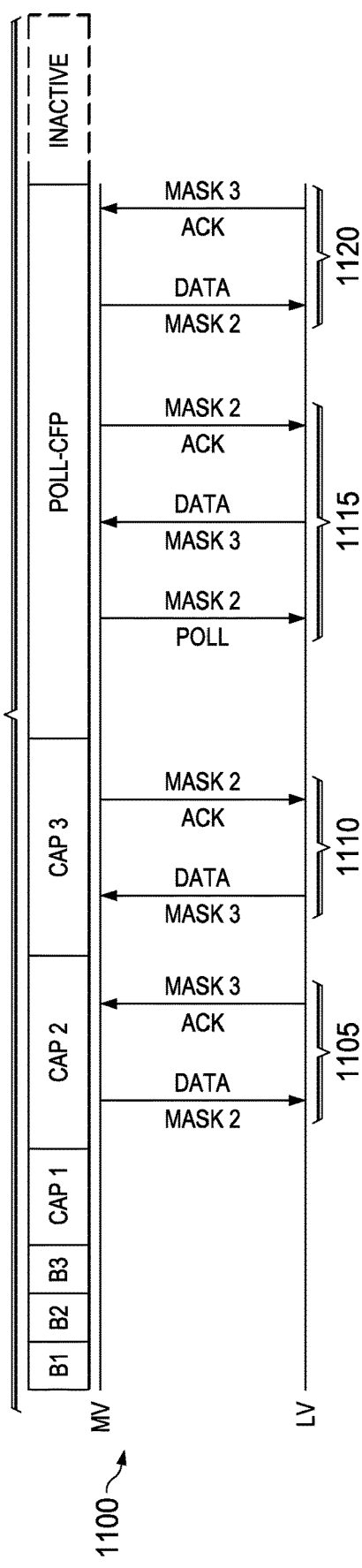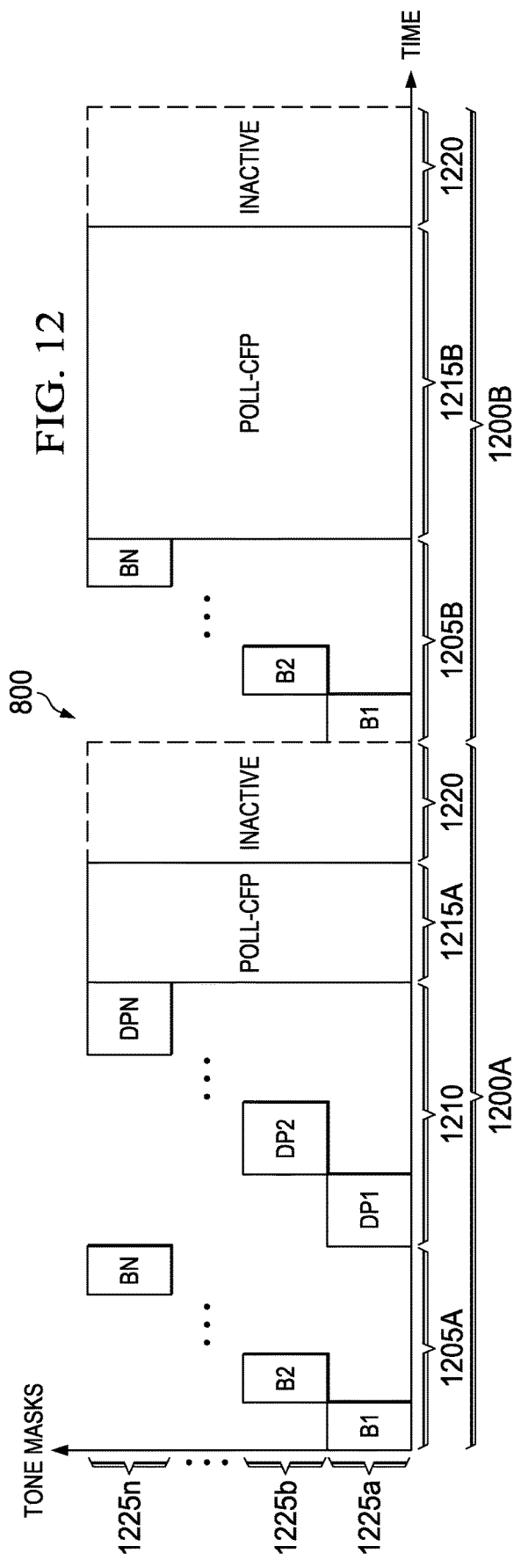

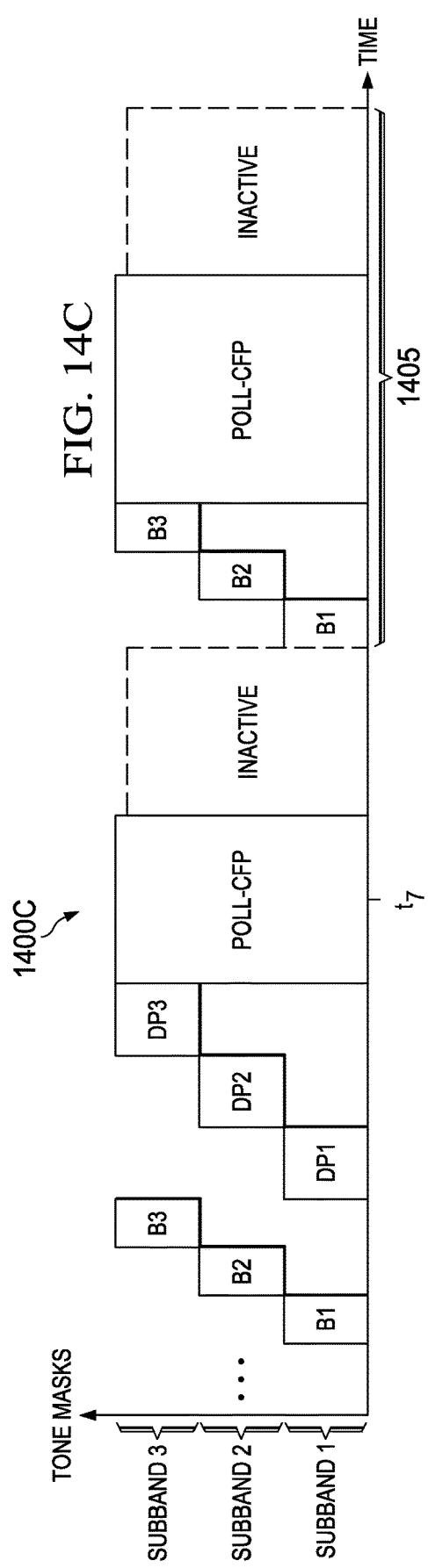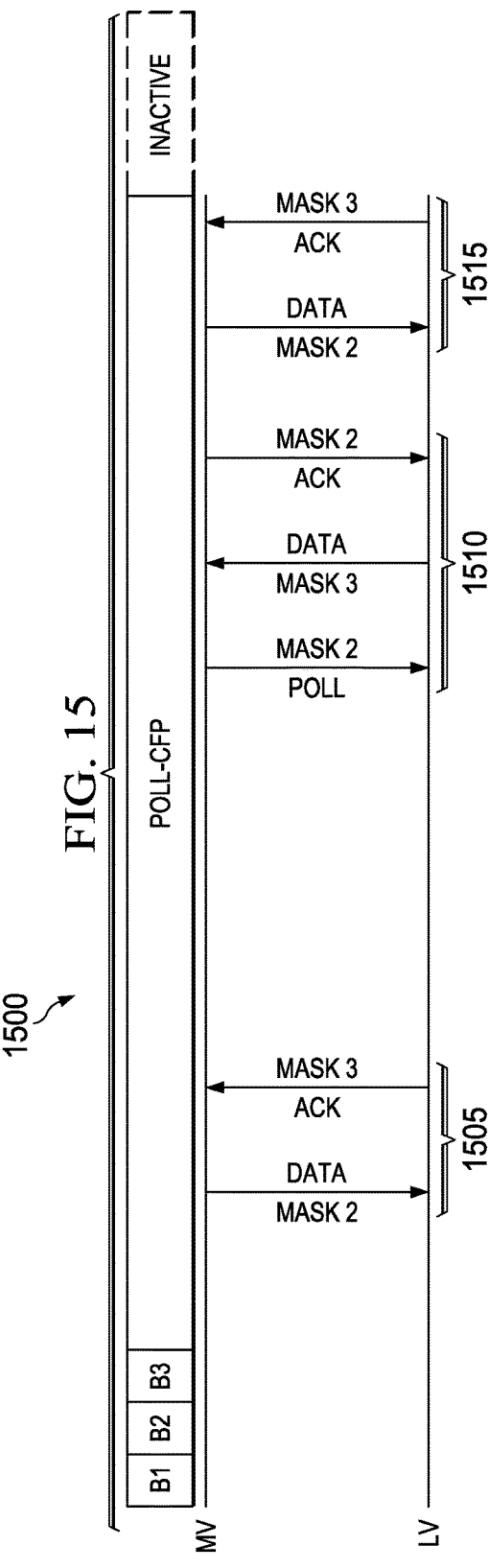

BEACON-ENABLED COMMUNICATIONS FOR VARIABLE PAYLOAD TRANSFERS

CROSS-REFERENCE TO RELATED APPLICATION

This application claims the benefit of the filing date of U.S. Provisional Patent Application No. 61/476,648 titled "Beacon Enabled Multi Tone Mask Communication for Variable Payload Transfer in MV-LV PLC" and filed Apr. 18, 2011, the disclosure of which is hereby incorporated by reference herein in its entirety.

TECHNICAL FIELD

This specification is directed, in general, to network communications, and, more specifically, to systems and methods for designing, using, and/or implementing beacon-enabled communications for variable payload transfers.

BACKGROUND

There are several different types of network communications available today. For example, Power Line Communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another PLC standardization effort includes, for example, the Powerline-Related Intelligent Metering Evolution (PRIME) standard designed for OFDM-based (Orthogonal Frequency-Division Multiplexing) communications.

SUMMARY

Systems and methods for designing, using, and/or implementing communications in beacon-enabled networks are described. In an illustrative, non-limiting embodiment, a method may include implementing a superframe structure having a plurality of beacon slots, a plurality of intermediate slots following the plurality of beacon slots, and a poll-based Contention Free Period (CFP) slot following the plurality of intermediate slots, each of the plurality of beacon slots and each of the plurality of intermediate slots corresponding to a respective one of a plurality of frequency subbands, and the poll-based CFP slot corresponding to a combination of the plurality of frequency subbands. The method may also include receiving a poll request over a first of the plurality of frequency subbands during the poll-based CFP slot, and, in response to the poll request, transmitting a data packet over a second of the plurality of frequency subbands during the poll-based CFP slot. In some embodiments, the method may also include, in response to transmitting the data packet, receiving an acknowledgement message over the first of the plurality of frequency subbands (e.g., immediately and/or during the poll-based CFP slot).

The method may further include adding an indication to the data packet of one or more outstanding data packets, and transmitting the one or more outstanding data packets over the second of the plurality of frequency subbands following the data packet during the poll-based CFP slot. In some cases, transmitting the one or more outstanding data packets may include transmitting the one or more outstanding data packets without exceeding a maximum number of packets transmittable in response to the poll request. Additionally or alternatively, transmitting the one or more outstanding data packets may include transmitting the one or more outstanding data packets without exceeding a maximum transmission duration.

As part of a discovery or setup operation, the method may include detecting at least one beacon during one of the plurality of beacon slots, the detected beacon having been transmitted over a respective frequency subband. The method may also include creating a downlink subband report based, at least in part, upon the detected beacon and transmitting the downlink subband report over each of the plurality of frequency subbands during respective intermediate slots. The method may further include receiving a subband allocation message, the subband allocation message identifying the first of the plurality of frequency subbands as suitable for subsequent downlink communications and identifying the second of the plurality of frequency subbands as suitable for subsequent uplink communications.

In some embodiments, the intermediate slots may be Contention Access Period (CAP) slots during which one or more other communications devices are allowed to compete with the communication device for access to a communication medium. In that case, the method may include receiving data over the first of the plurality of frequency subbands during a first CAP slot corresponding to the first frequency subband, and then transmitting an acknowledgement message over the second of the plurality of frequency subbands during the first CAP slot. Additionally or alternatively, the method may include transmitting data over the second of the plurality of frequency subbands during a second CAP slot corresponding to the second frequency subband, and then receiving an acknowledgement message over the first of the plurality of frequency subbands during the second CAP slot.

In other embodiments, the intermediate slots may be Discovery Phase (DP) slots during which the communication device may abstain or be otherwise prohibited from transmitting data packets. For example, the presence or absence of DP slots may be indicated in one or more beacons received over one or more of the plurality of beacon slots. Moreover, the presence or absence of DP slots may implement access control to increase, reduce, or limit a number of communication devices capable of joining a network.

In another illustrative, non-limiting embodiment, a method may include implementing a superframe structure having a plurality of beacon slots, a plurality of CAP slots following the plurality of beacon slots, and a poll-based CFP slot following the plurality of CAP slots, each of the plurality of beacon slots and each of the plurality of CAP slots corresponding to a respective one of a plurality of frequency subbands, and the poll-based CFP slot corresponding to a combination of the plurality of frequency subbands. The method may also include transmitting a poll request over a first of the plurality of frequency subbands during the poll-based CFP slot and, in response to the poll request, receiving a data packet over a second of the plurality of frequency subbands during the poll-based CFP slot. The method may also include, in response to having received the data packet, transmitting an acknowledgement message over the first of the plurality of frequency subbands during the poll-based CFP slot.

During the discovery or setup procedure, the method may include transmitting a plurality of beacons, each of the plurality of beacons transmitted over a corresponding one of the plurality of beacon slots. The method may also include receiving a downlink subband report during at least one of the plurality of CAP slots, and then transmitting a subband allocation message over the first of the plurality of frequency subbands during the poll-based CFP slot, the subband allocation message identifying the first of the plurality of frequency subbands as suitable for subsequent downlink communications and identifying the second of the plurality of frequency subbands as suitable for subsequent uplink communications.

In some implementations, the method may include transmitting data over the first of the plurality of frequency subbands during a first CAP slot corresponding to the first frequency subband, and then receive an acknowledgement message over the second of the plurality of frequency subbands during the first CAP slot. Additionally or alternatively, the method may include receiving data over the second of the plurality of frequency subbands during a second CAP slot corresponding to the second frequency subband, and transmitting an acknowledgement message over the first of the plurality of frequency subbands during the second CAP slot.

In yet another illustrative, non-limiting embodiment, a method may include implementing a first superframe structure having a plurality of beacon slots, a plurality of DP slots following the plurality of beacon slots, and a poll-based CFP slot following the plurality of DP slots, each of the plurality of beacon slots and each of the plurality of DP slots corresponding to a respective one of a plurality of frequency subbands, and the poll-based CFP slot corresponding to a combination of the plurality of frequency subbands. The method may also include transmitting a poll request over a first of the plurality of frequency subbands during the poll-based CFP slot and, in response to the poll request, receive a data packet over a second of the plurality of frequency subbands during the poll-based CFP slot.

The method may further include implementing a second superframe structure having the plurality of beacon slots and the poll-based CFP following the plurality of beacon slots, the second superframe structure excluding the plurality of DP slots. The method may then include, in response to one or more PLC devices being allowed to join the PLC data concentrator, following the first superframe structure. Alternatively, the method may include, in response to one or more PLC devices not being allowed to join the PLC data concentrator, following the second superframe structure.

In some embodiments, one or more communication devices or computer systems may perform one or more of the techniques described herein. In other embodiments, a tangible computer-readable or electronic storage medium may have program instructions stored thereon that, upon execution by one or more communication devices or computer systems, cause the one or more communication devices or computer systems to execute one or more operations disclosed herein. In yet other embodiments, a communication system (e.g., a device or modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
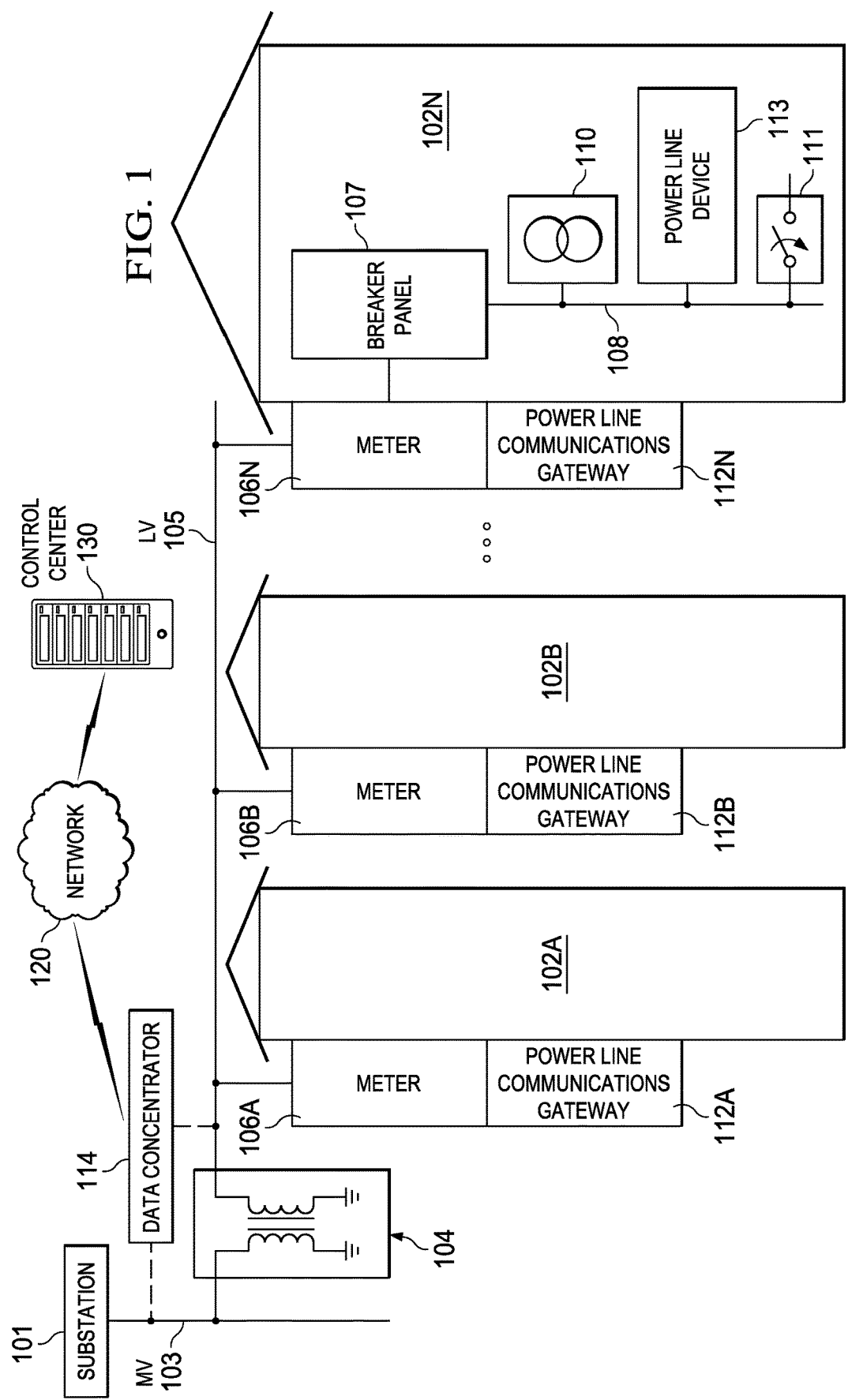

Having thus described the invention(s) in general terms, reference will now be made to the accompanying drawings, wherein:

FIG. 1 is a block diagram of a Power Line Communication (PLC) environment according to some embodiments.

Figure 2:
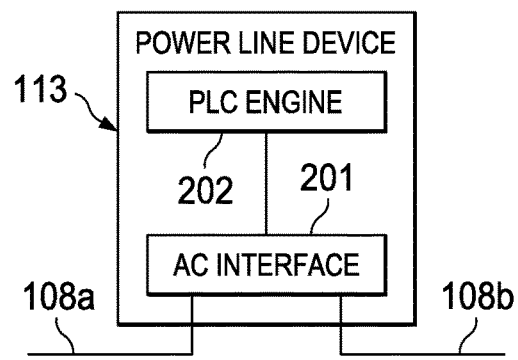

FIG. 2 is a block diagram of a PLC device or modem according to some embodiments.

Figure 3:
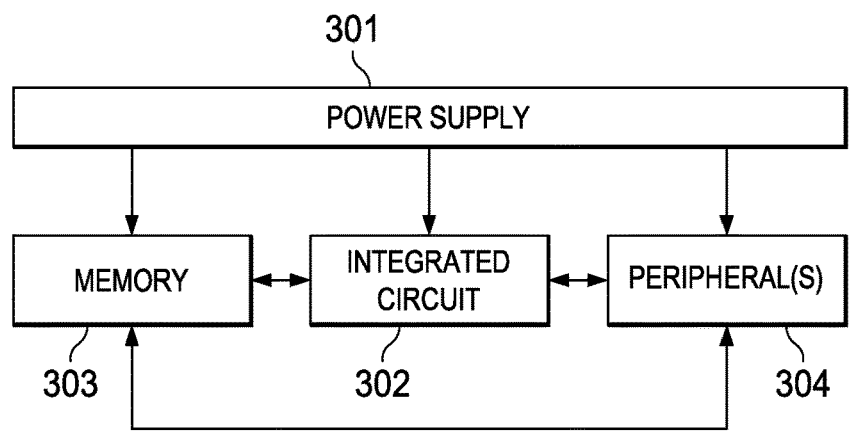

FIG. 3 is a block diagram of an integrated circuit according to some embodiments.

Figure 4:
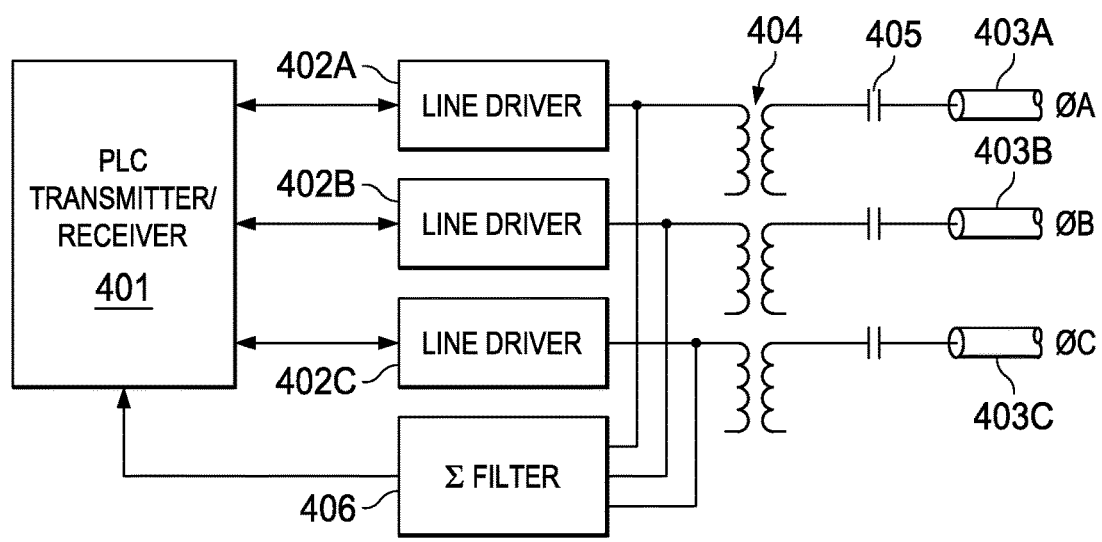
Figure 5:
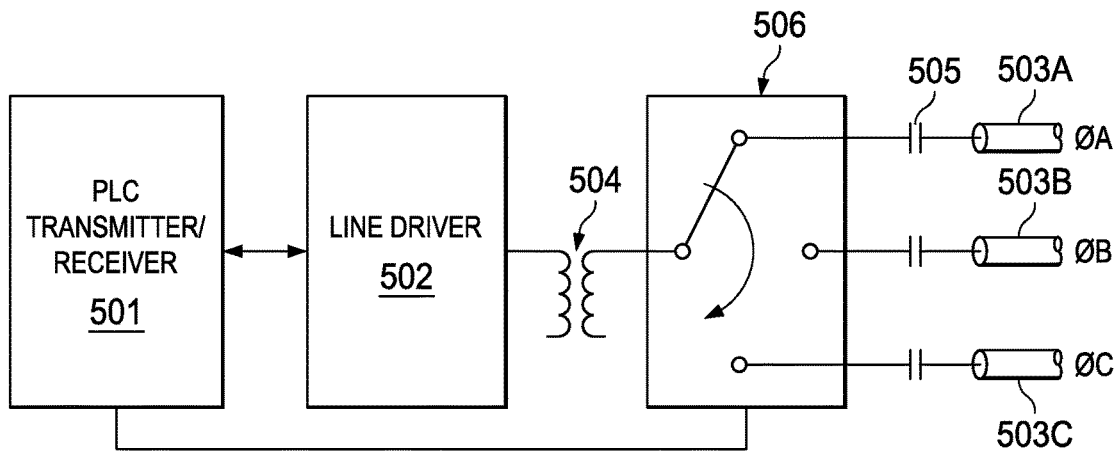
Figure 6:
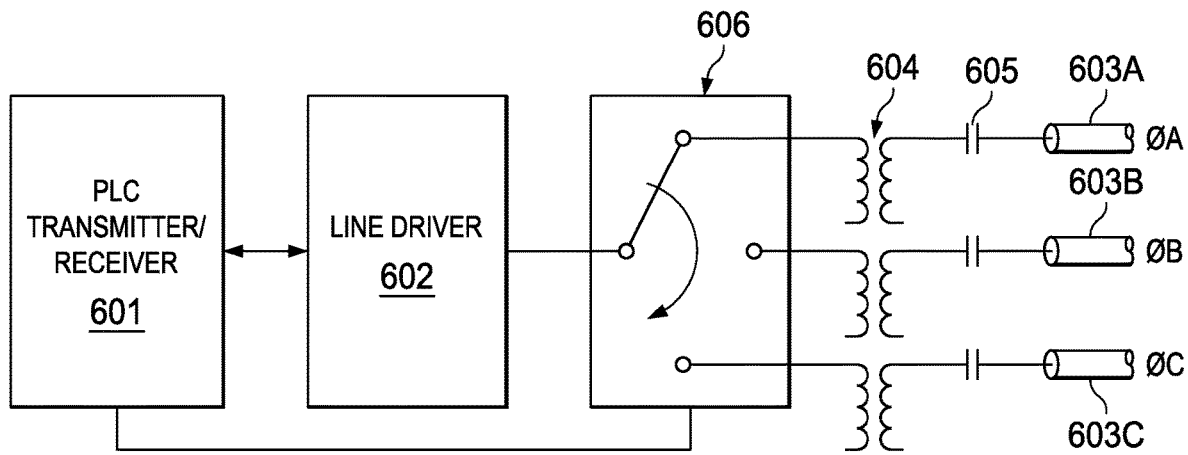

FIGS. 4-6 are block diagrams illustrating connections between a PLC transmitter and/or receiver circuitry to three-phase power lines according to some embodiments.

FIG. 7 is a block diagram of a hierarchical PLC communications network according to some embodiments.

FIG. 8 is a block diagram of a Contention Access Period (CAP)-based superframe suitable for PLC communications according to some embodiments.

Figure 9A:
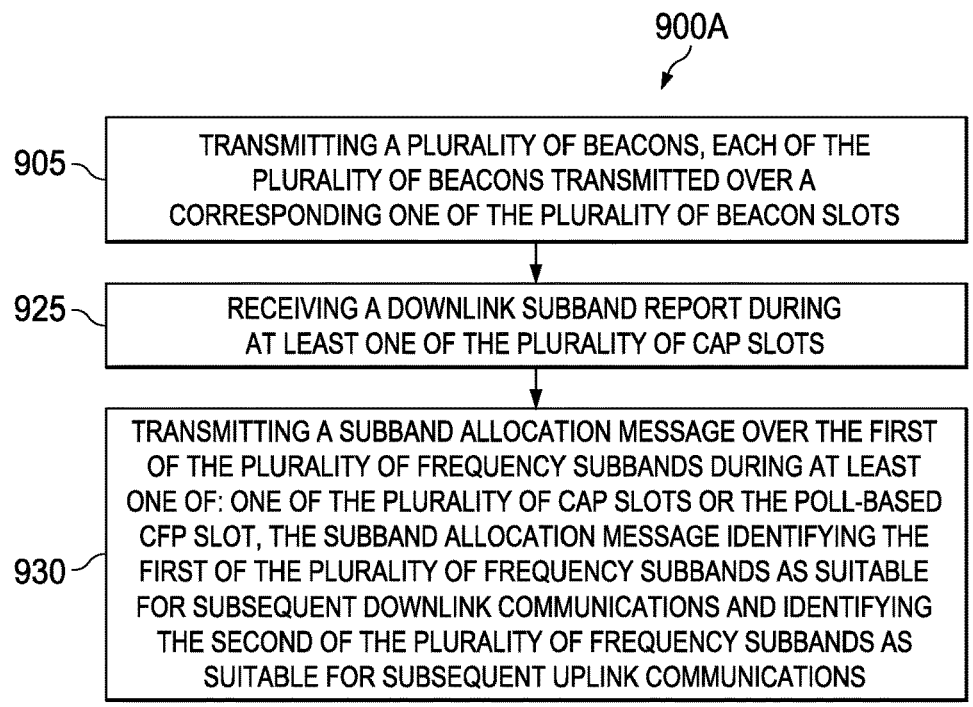
Figure 9B:
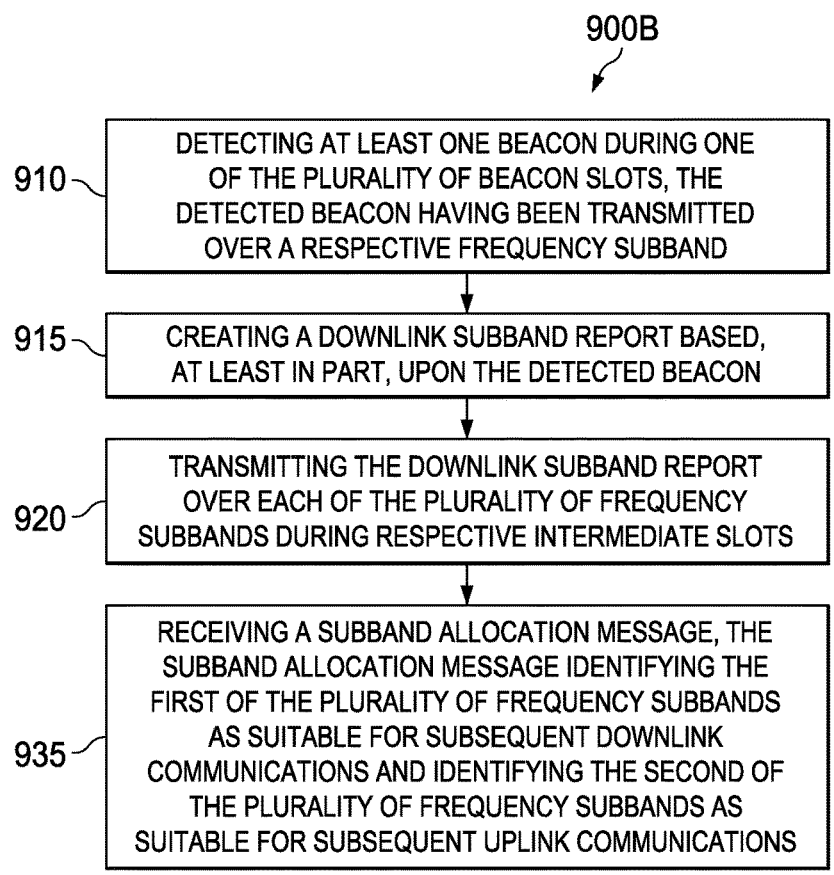

FIGS. 9A and 9B are flowcharts of a discovery method using a CAP-based superframe according to some embodiments.

FIGS. 10A-C are diagrams illustrating the discovery method using the CAP-based superframe according to some embodiments.

FIG. 11 is a diagram of a communication using the CAP-based superframe according to some embodiments.

FIG. 12 is a diagram of a Discovery Period (DP)-based superframe suitable for PLC communications according to some embodiments.

Figure 13:
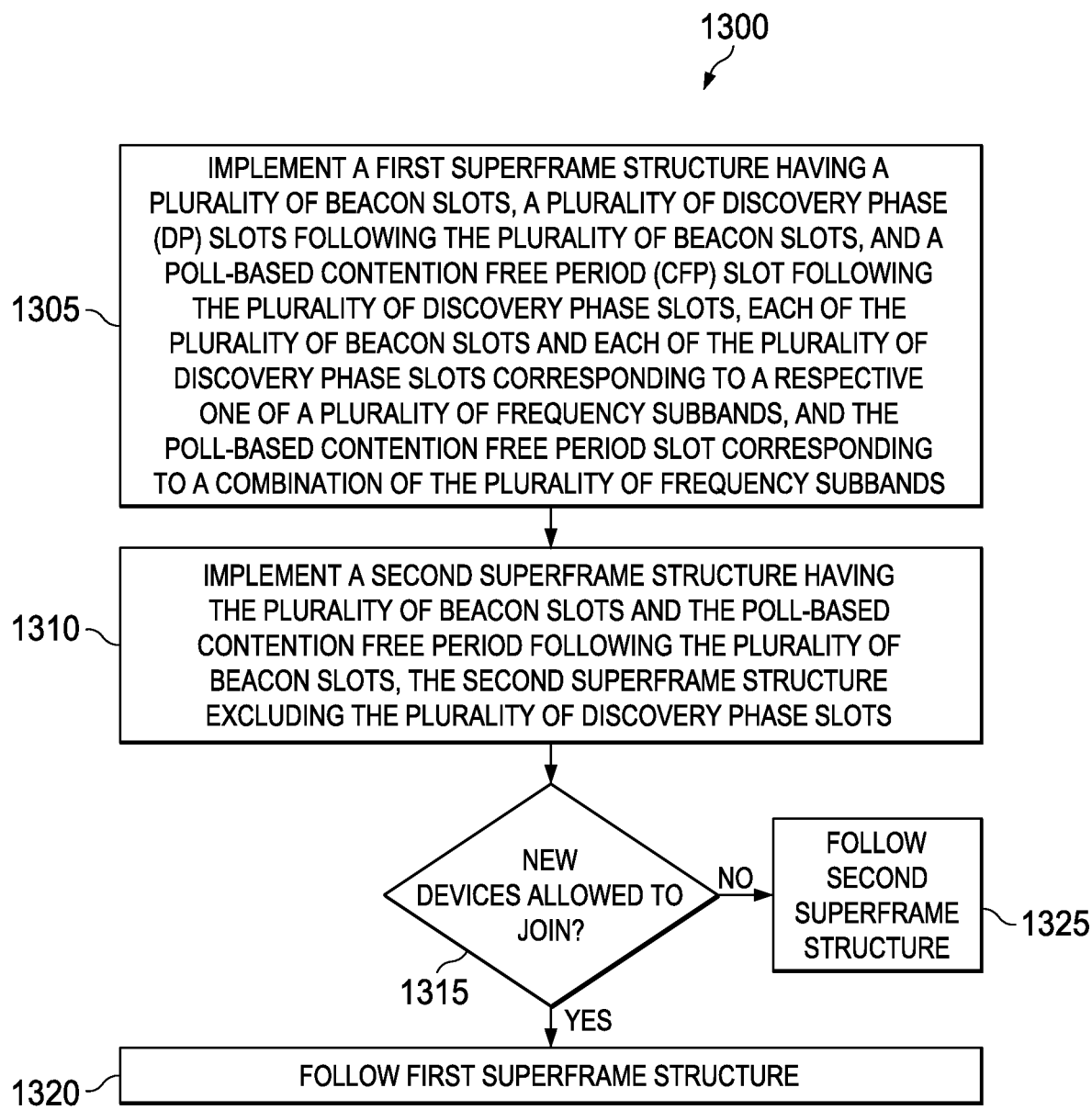

FIG. 13 is a flowchart of a method of operating using the DP-based superframe according to some embodiments.

Figure 14A:
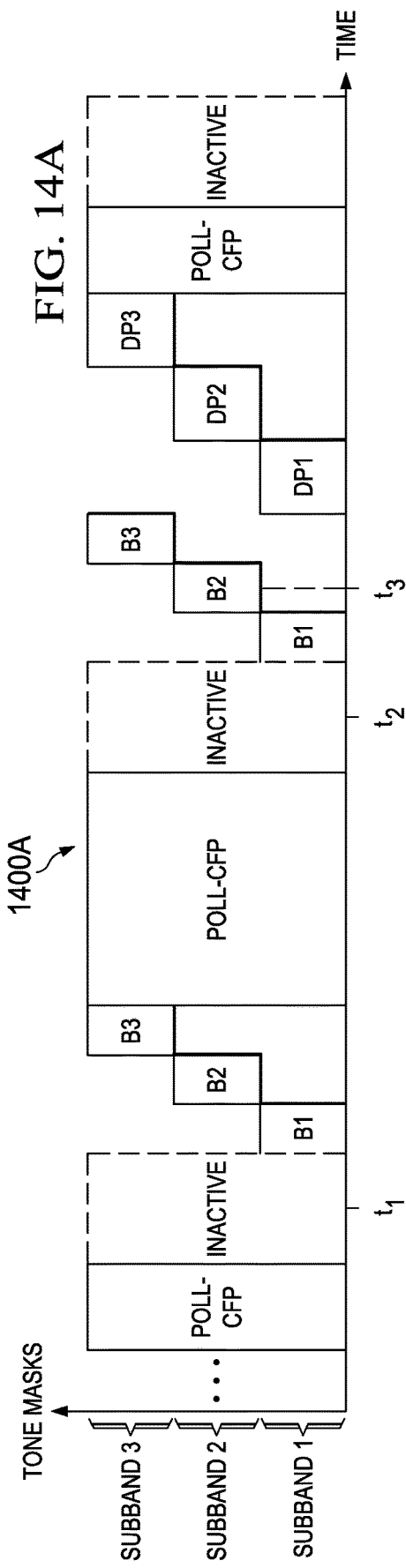
Figure 14B:
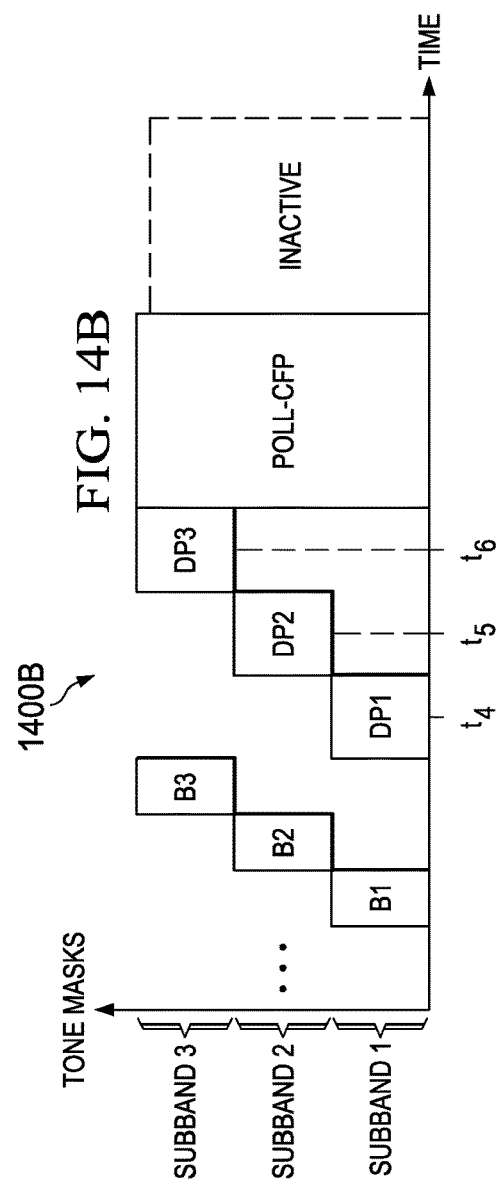

FIGS. 14A-C are diagrams illustrating a discovery method using the DP-based superframe according to some embodiments.

FIG. 15 is a diagram of a communication using the DP-based superframe according to some embodiments.

Figure 16:
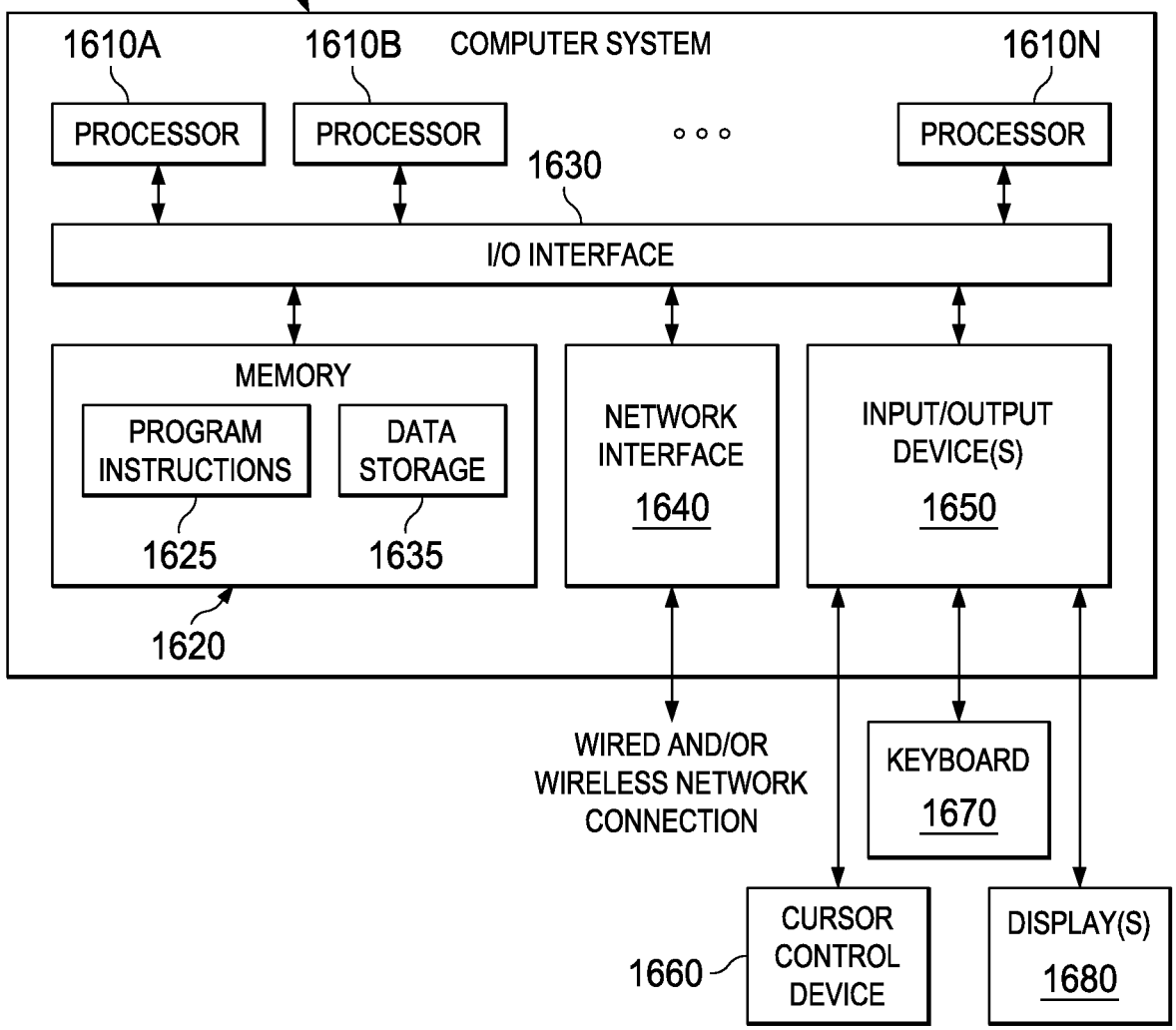

FIG. 16 is a block diagram of a computing system configured to implement certain systems and methods described herein according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, the systems and methods described herein may be used to design and/or implement communications in beacon-enabled networks. Generally speaking, these systems and methods may be applicable to a wide variety of communication environments, including, but not limited to, those involving wireless communications (e.g., cellular, Wi-Fi, WiMax, etc.), wired communications (e.g., Ethernet, etc.), power line communications (PLC), or the like. For ease of explanation, several examples discussed below are described specifically in the context of PLC. As a person of ordinary skill in the art will recognize in light of this disclosure, however, certain techniques and principles disclosed herein may also be applicable to other communication environments.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

In various implementations, PLC device or modem 113 may include transmitter and/or receiver circuits configured to connect to power lines 103, 105, and/or 108. FIG. 4 illustrates a connection between the power line communication transmitter and/or receiver circuitry to the power lines according to some embodiments. PLC transmitter/receiver 401 may function as the transmitter and/or receiver circuit. When PLC transmitter/receiver 401 operates as a transmitter, it may generate pre-coded signals for transmission over the power line network. Each output signal, which may be a digital signal, may be provided to a separate line driver circuit 402A-C. Line drivers 402A-C may comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line. Conversely, when PLC transmitter/receiver 401 operates as a receiver, coded signals may be received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

Turning to FIG. 7 a block diagram of a hierarchical PLC communications network 700 is depicted. In the embodiment shown, medium-voltage (MV) devices or modems MV1, MV2, and MV3 (e.g., PLC data concentrators, routers, etc.) are coupled to each other and/or to an MV power line (e.g., 103 in FIG. 1). First-level low-voltage (LV) devices $LV1_1$, $LV2_1$, $LV3_1$, and $LV4_1$ (e.g., a PLC charger, a PLC meter, a PLC modem, etc.) are coupled to an LV power line (e.g., 105 in FIG. 1) through transformers 705a and 705b (e.g., 104 in FIG. 1). Second-level LV devices $LV1_2$ and $LV2_2$ are coupled to device $LV1_1$. Third-level device $LV1_3$ is coupled to device $LV2_2$, and fourth-level device $LV1_4$ is coupled to device $LV1_3$ (second-, third-, and fourth-level devices may be referred to as "lower-level" devices). It should be noted that network 700 is presented for sake of illustration only, and that in any given implementation may include an arbitrary number of MV and/or LV devices coupled in different ways under a different hierarchy. As illustrated, at least three different types of communication take place in network 700; namely, between MV devices (the "MV-MV network"), between MV devices and first-level LV devices (the "MV-LV network"), and among LV devices (the "LV-LV network").

Within network 700, communications may be achieved between or among devices using one or more different frequency subbands (also referred to as "tone masks" or "channels") in the downlink and uplink directions. Generally speaking, the term "downlink" refers to a communication in a direction that is received by a given device, and the term "uplink" refers to a communication in a direction that is transmitted by that same device. In the case of MV-LV communications, however, the term "downlink" refers to links or communications taking place from an MV device to an LV device, and the term "uplink" refers to links or communications taking place from an LV device to an MV device.

In a typical case, the frequency subband over which an MV device can communicate with an LV device (downlink) may be different from the subband that the LV device may used to communicate with an MV device (uplink). Also, the uplink and downlink subbands may be different between different LV devices communicating with the same MV device. As such, each PLC device involved in a communication may select (or allow another device to select) good or best communication channels or subbands, for example, based upon a determination of channel conditions (e.g., signal-to-noise ratio (SNR) measurements, congestion indicators, etc.) or the like.

In some embodiments, the PLC devices described above (and/or the computer system shown in FIG. 16) may be configured to implement one or more communication techniques through modifications to the network's MAC protocol. Generally speaking, a MAC protocol is a sub-layer of a data link layer specified in a seven-layer Open Systems Interconnection (OSI) model. Particularly, a MAC protocol may provide addressing and channel access control mechanisms that enable terminals or network nodes (e.g., PLC modems, etc.) to communicate over a shared medium (i.e., a power line). To facilitate communications among the devices described above, each device may implement a MAC protocol configured to coordinate inter-device communications according to one or more "superframe" structures. Such superframes may define the duration and/or relative times for transmission and/or receipt of different types of information by each device.

In the description that follows, two different types of superframe structures are disclosed. A first type of superframe structure ("CAP-based") is described with respect to FIGS. 8-11, and a second type of superframe structure ("DP-based") is described with respect to FIGS. 12-15. It should be noted, however, that in some embodiments both types of superframes may co-exist in the same network and/or may be employed by a single communication device.

FIG. 8 is a block diagram of a Contention Access Period (CAP)-based superframe suitable for PLC communications according to some embodiments. As illustrated, superframe 800 includes beacon slots 805 (e.g., $B_1$, $B_2$, ..., $B_N$), followed by Contention Access Period (CAP) slots 810 (e.g., $CAP_1$, $CAP_2$, ..., $CAP_N$), which are in turn followed by poll-based Contention Free Period (CFP) slot 815, and then by inactive or idle period 820. (CAP slots 810 may also be referred to as "intermediate slots" because they are located between beacon slots 805 and poll-based CFP slot 815.)

In various embodiments, superframe 800 may be particularly well suited for use by the MV devices (e.g., MV1, MV2, or MV3) shown in FIG. 7. In such cases, during beacon slots 805, an MV device may transmit one or more beacon packets (e.g., over slots $B_1$, $B_2$, ..., $B_N$) to one other MV devices and/or to one or more first-level LV devices $LV1_1$, $LV2_1$, $LV3_1$, and/or $LV4_1$ (i.e., in a downlink direction). Moreover, each beacon packet may include information that identifies the particular beacon slot over which it was sent and/or it may indicate the length, position, and/or duration of other elements in superframe 800 (e.g., other beacon slots, CAP slots 810, poll-based CFP 815, and inactivity period 820). Accordingly, once a listening first-level LV device receives a given beacon packet, for example, the structure and/or timing of superframe 800 may be readily acquired or derived by that device.

During CAP slots 810, superframe 800 may allow one or more of first-level LV devices $LV1_1$, $LV2_1$, $LV3_1$, and/or $LV4_1$ to transmit packets to an MV device (i.e., in the uplink direction), subject to contention or competition for the medium (e.g., using a carrier sense multiple access (CSMA) technique or the like). During CFP 820, however, MV1 may employ a poll-based mechanism for uplink and/or downlink communications (e.g., on-demand) with first-level PLC devices $LV1_1$, $LV2_1$, $LV3_1$, and/or $LV4_1$ without contention and/or risk of collision.

As illustrated, beacon slots 805 and CAP slots 810 in superframe 800 may be divided into tone masks or frequency subbands 825a-n. Specifically, $B_1$ and $CAP_1$ occupy frequency subband 825a, $B_2$ and $CAP_2$ occupy frequency subband 825b, and $B_N$ and $CAP_N$ occupy frequency subband $825_N$. Hence, in this case, each of beacon slots 805 and CAP slots 810 follow a same sequence of frequency subbands. In other cases, however, beacon slots 805 and CAP slots 810 may follow different sequences of frequency subbands. Moreover, poll-based CFP slot 815 spans all subbands 825a-n at the same time. It should be noted that any given implementation may include any arbitrary number of two or more frequency subbands. Also, in some implementations, each of tone masks 825a-n may have an equal, predetermined spectral width. Additionally or alternatively, tone masks 825a-n may have different spectral widths. Similarly, each of CAP slots 810 may have an equal, predetermined duration or length. Additionally or alternatively, CAP slots 810 may have varying durations or lengths.

In this manner, first-level LV devices $LV1_1$, $LV2_1$, $LV3_1$, and/or $LV4_1$ intending to contend in a given channel may choose one of CAP slots 810 in which to transmit a packet to MV1, MV2, and/or MV4. Collision may still happen, for example, if two different nodes select the same one of CAP slots 810. However, if only one node chooses a particular one of CAP slots 810, then it may have its transmission free from collisions during the entire transmission time. These techniques may therefore be particularly useful to avoid or otherwise reduce "hidden node" problems, where one of first-level LV devices $LV1_1$, $LV2_1$, or $LV3_1$ cannot sense (e.g., via carrier sense multiple access (CSMA) or the like) an ongoing transmission by another first-level LV device $LV4_1$ because such a transmission is attenuated in the LV power line due to transformers 705a-b. If a first-level LV device (e.g., $LV1_1$) cannot sense $LV4_1$'s ongoing transmission and thus decides to initiate their own transmission, the two concurrent transmissions from the different sources $LV1_1$ and $LV4_1$ may collide in MV power line, and MV devices would not be able to receive either communication.

As noted above, any given one of MV devices MV1, MV2, or MV3 of FIG. 7 may employ a superframe such as superframe 800. In some embodiments, techniques may be provided to allow one of first-level LV devices $LV1_1$, $LV2_1$, $LV3_1$, and/or $LV4_1$ to be "discovered" by the MV device, for example, when such an LV device is added to an existing network and/or when the entire network is initialized. In that regard, FIGS. 9A and 9B are flowcharts of a discovery method using a CAP-based superframe. In some implementations, method 900A may be performed by one of MV devices MV1, MV2, or MV3, whereas method 900B may be performed by a first-level LV device $LV1_1$, $LV2_1$, $LV3_1$, or $LV4_1$. To help explain these methods, FIGS. 10A-C are also provided. Particularly, diagrams 1000A-C illustrate methods 900A and 900B using CAP-based superframe in an example environment employing three frequency subbands ("subband 1," "subband 2," and "subband 3").

At block 905, an MV device may transmit a plurality of beacons, each of the beacons transmitted over a corresponding one of a plurality of beacon slots. At block 910, an LV device may detect at least one of the transmitted beacon during a given one of the plurality of beacon slots over a respective frequency subband. In the example of FIG. 10A, the LV device starts listening for MV devices at time $t_1$, which corresponds to a period of inactivity of a given superframe. To that end, the LV device may passively listen for beacons in the first subband (subband 1). It is assumed, for sake of illustration, that the first and third frequency subbands (subbands 1 and 3) have poor channel conditions (e.g., SNR, interference, etc.) and therefore only $B_2$ arrives at the receiver of the LV device over subband 2. Because the LV device's receiver is tuned to subband 1, however, the LV device does not detect any beacons transmitted by the MV device. At time $t_2$, however, the LV device may tune its receiver to subband 2. Thus, at time $t_3$, the LV device may finally detect $B_2$. Also, once $B_2$ is received, the LV device may have knowledge of all subsequent superframe slots (e.g., when/where each beacon slot begins and ends, when/where each CAP slots begins and ends, and when/where the poll-based CFP and inactive slots begin and end). Therefore, at block 915, the LV device may create a downlink subband report for each of subbands 1-3. Such a report may include, for example, a link quality indicator or the like (e.g., SNR, etc.), which may be calculated or estimated based upon the received (and/or not received) beacons.

At block 920, the LV device may transmit the downlink subband report to the MV device over each of subbands 1-3 during each respective CAP slot. At block 925, the MV device may receive the report during the CAP slots. Diagram 1000B shows the report being transmitted by the LV device to the MV device during three distinct times $t_4$, $t_5$, and $t_6$ over subband 1, subband 2, and subband 3 during $CAP_1$, $CAP_2$, and $CAP_3$, respectively. Here it is assumed that, due to channel conditions in the uplink direction, only the report transmitted during $CAP_3$ is actually received by the MV device at block 925. As such, the MV device may allocate subband 2 for downlink communications and subband 3 for uplink communications with the LV device. In other situations, however, the MV device may receive the downlink subband report in more than one CAP slot, and may used the received downlink subband report(s) to determine a good or better uplink channel.

It should be noted that, unlike illustrated in FIG. 8, in other embodiments subbands 1-3 may be different in the uplink and downlink directions, and therefore subject to different channel conditions. Also, in some cases, although physical channel conditions may otherwise be favorable, other LV devices may already be assigned a particular channel. Therefore, the MV device may select a sub-optimal subband (from the perspective of SNR, for example) for a given LV device, for instance, to reduce the possibility of collisions with other devices. Furthermore, in some cases, the LV device may select the downlink subband and communicate its selection to the MV device (instead of or in addition to a downlink subband report).

At block 930, the MV device may transmit a subband allocation message over the selected downlink subband. At block 935, the LV device may receive the subband allocation message. Such a message may be transmitted, for example, during the poll-based CFP slot at time $t_7$, as shown in diagram 1000C, and/or during one or more of the plurality of CAP slots. The message may identify both downlink and uplink subbands for subsequent communications (e.g., in this example, the downlink subband may be subband 2, and the uplink subband may be subband 3). In some cases, $t_3$-$t_7$ may take place during the same superframe. In other cases, $t_3$-$t_7$ may take place over two or more superframes.

After the discovery or setup period, the LV device knows which mask to use for receiving beacon and data in the downlink direction (the MV devices knows which mask to use for transmissions). The LV device also knows which mask to use for transmitting data in the uplink direction (the MV device known which mask to use for receptions). The LV device also knows the MV device's superframe structure, CAP locations and poll-based CFP duration. As such, the MV and LV devices may communicate using the assigned or selected frequency subbands in their respective directions.

FIG. 11 is a diagram of communications according to some embodiments. During downlink data communication 1105 over $CAP_2$ of superframe 1100, the MV device transmits data to the LV device over the assigned downlink subband (subband 2) and switches its receiver to subband 3. It should be noted that the MV device would ordinarily operate its receiver in subband 2 during $CAP_2$, and that the switching to subband 3 is made to accommodate a quicker or "immediate" acknowledgement from the LV device over its assigned subband (i.e., subband 3). As such, in some cases the MV device's receiver may operate in subband 3 during $CAP_2$ only for the duration of an acknowledgement timeout.

At least during $CAP_2$, the LV device has its receiver tuned to the downlink subband (subband 2), and therefore receives the data. In response to having received the data, the LV device switches its transmitter to the assigned uplink subband (subband 3) and transmits an acknowledgement message or packet to the MV device, still during $CAP_2$. Again, an LV device would generally operate its transmitter in the uplink subband corresponding to the particular CAP slot. However, any acknowledgement would then only be able to be sent during the CAP slot associated with the LV device (in this case, over subband 3 during $CAP_3$). Therefore, in order to provide a "quicker" or "instant" acknowledgement, the LV device may operate outside of the frequency subband associated with a current CAP slot (in this example, the LV device's transmitter uses subband 3 during $CAP_2$). As long as the acknowledgement is received prior to the expiration of the acknowledgement timeout, the MV device receives it. If the acknowledgment is not received prior to the timeout, the MV device may return its receiver to subband 2 (i.e., the subband ordinarily associated with $CAP_2$) and may attempt to send the same data again (e.g., in the same or a subsequent superframe).

During data uplink communication 1100 over $CAP_3$, the LV device wins any contention for the medium (e.g., it may be first among other LV devices in the same network to attempt a transmission) and transmits data to the MV device over the assigned uplink subband (subband 3), which corresponds to the current CAP slot ($CAP_3$). In response, the LV device receives an acknowledgement from the MV device over the assigned downlink subband (subband 2).

Data uplink communication 1115 takes place during a poll-based CFP slot. As illustrated, the MV device sends a poll message over the assigned downlink subband (subband 2). The LV device switches to the assigned uplink subband (subband 3) to transmit data, and the MV device response with an acknowledgement over the downlink subband (subband 2). Data downlink communication 1120 also takes place during the poll-based CFP slot. Here, the MV device transmits data to the LV device over the assigned downlink subband (subband 2; no poll necessary) and receives the acknowledgement over the assigned uplink subband (subband 3).

In other words, during poll-based CFP, a polling message is transmitted on the downlink subbands of an LV device and the data is transmitted by the LV device on the uplink subband. The MV device switches its receiver to the uplink subbands of the corresponding LV node after transmitting a poll. If a transmission is not sensed within a certain timeout (e.g., a polling timeout), the MV device may then initiate the poll for the next LV device in the network.

Accordingly, using the CAP-based systems and methods described above, data transfers may be performed both during CAP and poll-based CFP slots. During CAP slots, devices may use a CSMA technique (e.g., slotted CSMA) over a corresponding tone mask to compete for access to the medium. LV devices may optionally transfer data to the MV modem during appropriate CAP uplink subband, although they may suffer from hidden node problem from a neighboring LV device operating on the same subband. Conversely, the MV device may transfer data to LV device during the appropriate CAP downlink subband (for the LV device). Here, there is no hidden node issue since MV-LV transmission is heard by all LV devices in the network.

In contrast with CAP communications, poll-based CFP communications may avoid hidden node problem because polling is performed for each LV device. For uplink transmissions, the MV device may poll each LV device for data during the poll-based CFP slot. The poll may be transmitted on the downlink sub-band of an LV device and the corresponding data may be transmitted by the LV device on the uplink sub-band. The MV device may switch its receiver to the uplink subband assigned to the corresponding LV device after transmitting the poll. The LV device may use the poll to prepare and transmit the packet. In some cases, if there are multiple packets to be transmitted, a "more" bit (e.g., set to "1") or other suitable indication may be used in the packet header, for example, to indicate outstanding packets. Also, the MV device may limit the number of packets (or duration) that can be received for a poll request. If a transmission is not sensed within a certain timeout ("Poll Timer"), the MV device may initiate the poll for the next LV node. For downlink transmissions, the MV device may send downlink data at any time during the poll-based CFP slot to the LV devices at the appropriate downlink subbands (as long as the Poll Timer is not set). Also, an acknowledgement for a packet may be sent in the corresponding mask for the opposite direction.

As previously noted, in addition or as an alternative to the CAP-based techniques described above, a second type of superframe structure ("DP-based") may be used. These embodiments are discussed below. Particularly, FIG. 12 is a diagram of a Discovery Period (DP)-based superframe suitable for PLC communications according to some embodiments. As illustrated, discovery superframe 1200A includes beacon slots 1205A (e.g., $B_1, B_2, \ldots, B_N$), followed by Discovery Period (DP) slots 1210 (e.g., $DP_1, DP_2, \ldots, DP_N$), which are in turn followed by poll-based Contention Free Period (CFP) slot 1215A, and then by inactive or idle period 1220. (DP slots 1210 may also be referred to as "intermediate slots" because they are located between beacon slots 1205A and poll-based CFP slot 1215A.) In some embodiments, beacons transmitted over beacon slots 1205A may indicate the presence of DP slots 1210. Following discovery superframe 1200A, communication superframe 1200B includes beacon slots 1205B (e.g., $B_1, B_2, \ldots, B_N$) followed poll-based CFP slot 1215B and then by inactive or idle period 1220, without any DP or intermediate slots. Further, beacons transmitted over beacon slots 1205B may indicate the absence of DP slots. Also, similarly as in FIG. 8, beacon slots 1205A-B and DP slots 1210 may be divided into tone masks or frequency subbands 1225a-n, whereas poll-based CFP slot 1215A spans all frequency subbands 1225a-n at the same time.

Compared with the CAP-based approach, the DP-based approach provides an optional discovery phase (discovery superframe 1200A) with DP slots 1210 for each tone mask. As its name suggests, such a discovery phase may be used for device discovery and network setup operations, but not for ordinary data transfers. Instead, poll-based CFP 1215A-B may be used for all uplink and downlink data transmissions (i.e., in lieu of CAP slots). As such, LV devices need not perform CSMA or other carrier access CA operations because data access uses poll-based CFP; and the hidden node problem may be avoided. Beacons $B_1, B_2, \ldots, B_N$ may include information regarding DP assignments, and poll-based CFP 1215A duration may be reduced (compared to poll-based CFP 1251B) when DP slots 1210 are used to ensure the same overall superframe duration between 1200A and 1200B.

In some embodiments, only discovery superframes 1200A may be used (and communication superframe 1200B may be absent). In other embodiments, discovery superframe 1200A may alternate with one or more communication superframes 1200B at a fixed rate (e.g., one discovery superframe 1200A for every N communication superframes 1200B, where N is an integer). In yet other embodiments, discovery superframe 1200A may be present in a superframe at the discretion of the MV device. For example, an MV device may detect a triggering event (e.g., a predetermined time, absence of an expected communication, loss of contact with an LV device that had previously joined the MV device, etc.), and may introduce a discovery superframe 1200A into and otherwise stream of communication superframes 1200B. Again, in some cases, beacons $B_1, B_2, \ldots, B_N$ may indicate the presence of discovery superframe 1200A.

FIG. 13 is a flowchart of a method of operating using a DP-based superframe. In some embodiments, method 1300 may be performed, at least in part, by one of MV devices MV1, MV2, or MV3 shown in FIG. 7. At block 1305, method 1300 may include implementing a first superframe (e.g., discovery superframe 1200A) having a plurality of beacon slots, a plurality of DP slots following the beacon slots, and a poll-based CFP slot following the DP slots, similarly as shown in FIG. 12. At block 1310, method 1300 may include implementing a second superframe (e.g., communication superframe 1200B) having the plurality of beacon slots and the poll-based CFP slot following the beacon slots, as also similarly as shown in FIG. 12. In some cases, the poll-based CFP slot of the second superframe may be larger or longer than its counterpart in the first superframe (e.g., it may include time that would be allocated to DP slots in the first superframe). Additionally or alternatively, in cases where the first and second superframes include inactivity periods, the inactivity period of the second superframe may be shorter than the inactivity period of the first superframe. At block 1315, method 1300 may include determining whether new LV devices are allowed to join the MV device and/or the network. If so, the MV device may follow the first superframe (i.e., discovery superframe 1200A) in block 1320; otherwise the MV device may follow the second superframe (i.e., communication superframe 1200B) in block 1325.

When discovery superframe 1200A is employed, LV devices may be allowed to join the network. Although the discovery process is similar to the three-way handshake algorithm of the CAP-based method (shown in FIGS. 9-10), FIGS. 14A-C illustrate the process for the DP-based method for sake of completeness. Particularly, in diagram 1400A the LV device starts listening for MV devices at time $t_1$, which corresponds to a period of inactivity of a given superframe. To that end, the LV device may passively listen for beacons in the first subband (subband 1). Similarly as before, it is also assumed that the first and third frequency subbands (subbands 1 and 3) have poor channel conditions, and therefore only $B_2$ arrives at the receiver of the LV device over subband 2. Because the LV device's receiver is tuned to subband 1, however, the LV device does not detect beacons transmitted by the MV device. At time $t_2$, however, the LV device may tune its receiver to subband 2. Thus, at time $t_3$, the LV device may finally detect $B_2$. Also, once $B_2$ is received, the LV device may have knowledge of all subsequent superframe slots (e.g., when/when a discovery superframe starts, when/where each beacon slot begins and ends, when/where each DP slots begins and ends, and when/where the poll-based CFP and inactive slots begin and end).

Diagram 1400B shows a downlink subband report being transmitted by the LV device to the MV device during three distinct times $t_4$, $t_5$, and $t_6$ over subband 1, subband 2, and subband 3 during $DP_1$, $DP_2$, and $DP_3$, respectively. It is also assumed that, due to channel conditions in the uplink direction, only the report transmitted during $DP_3$ is actually received by the MV device. As such, the MV device may allocate subband 2 for downlink communications and subband 3 for uplink communications with the LV device. The LV device may receive a subband allocation message, for example, during the poll-based CFP slot at time $t_7$, as shown in diagram 1400C. The message may identify both downlink and uplink subbands for subsequent communications (e.g., in this example, the downlink subband may be subband 2, and the uplink subband may be subband 3). After the discovery superframe, the LV device may communicate with the MV device (and vice-versa) during subsequent communication superframes. Similarly as in FIG. 10, in some cases $t_3$-$t_7$ may take place during the same superframe. In other cases, $t_3$-$t_7$ may take place over two or more superframes.

FIG. 15 is a diagram of a communication using the DP-based superframe according to some embodiments. During downlink communications 1505 and 1515, an MV device may transmit data to an LV device over an assigned downlink subband (e.g., subband 2) during a poll-based CFP slot of communication superframe 1500 (without sending a polling message), and it may receive an acknowledgement over the assigned uplink subband (e.g., subband 3) in return. To establish uplink communications 1510, however, the MV device first sends the LV device a polling message or request over the assigned downlink subband, and receives data from the LV device over the assigned uplink subband prior to returning an acknowledgement.

In sum, using DP-based techniques, data transfer may be performed using poll-based CFP only (DP slots are used only for the discovery phase). Poll-CFP transmissions avoid hidden node problems since polling is performed for each LV device. For uplink transmissions, the MV device may poll each LV device for data in the poll-CFP period. A poll request may be transmitted over the downlink subband of an LV device, and the LV device may transmit the corresponding data over the uplink subband. The MV device may switch its receiver to the uplink subband of the corresponding LV device after transmitting the poll. The LV device may use the poll to prepare and transmit the packet. If a transmission is not sensed within a certain timeout ("Poll Timer"), the MV device may initiate the poll for the next LV device. For downlink transmissions, the MV device may send downlink data at any time during poll-CFP slot to the LV device over the appropriate downlink sub bands (as long as Poll Timer is not set).

It should be noted, however, that DP slots need not be present in a given superframe. Their presence or absence may be indicated, for example, in preceding beacons. As such, the presence (or absence) of DP slots may be used for access control. For example, if an MV device is currently allowing new LV devices to join or otherwise access the network, it may employ a superframe with DP slots. Conversely, if the MV devices does not allow LV devices to join or access the network (e.g., in the presence of congestion above a threshold value, etc.), it may omit DP slots from its superframe. In other words, the presence or absence of DP slots may be used to limit a number of nodes joining a network, or the like.

As previously noted, in certain embodiments, systems and methods for designing, using, and/or implementing communications in beacon-enabled networks may be executed, at least in part, by one or more communication devices and/or computer systems. One such computer system is illustrated in FIG. 16. In various embodiments, system 1600 may be implemented as a communication device, modem, data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 1600 includes one or more processors 1610 coupled to a system memory 1620 via an input/output (I/O) interface 1630. Computer system 1600 further includes a network interface 1640 coupled to I/O interface 1630, and one or more input/output devices 1625, such as cursor control device 1660, keyboard 1670, display(s) 1680, and/or mobile device 1690. In various embodiments, computer system 1600 may be a single-processor system including one processor 1610, or a multi-processor system including two or more processors 1610 (e.g., two, four, eight, or another suitable number). Processors 1610 may be any processor capable of executing program instructions. For example, in various embodiments, processors 1610 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1610 may commonly, but not necessarily, implement the same ISA. Also, in some embodiments, at least one processor 1610 may be a graphics processing unit (GPU) or other dedicated graphics-rendering device.

System memory 1620 may be configured to store program instructions and/or data accessible by processor 1610. In various embodiments, system memory 1620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1620 as program instructions 1625 and data storage 1635, respectively. In other embodiments, program instructions and/or data may be received, sent or stored upon different types of computer-accessible media or on similar media separate from system memory 1620 or computer system 1600. Generally speaking, a computer-accessible medium may include any tangible storage media or memory media such as magnetic or optical media—e.g., disk or CD/DVD-ROM coupled to computer system 1600 via I/O interface 1630. Program instructions and data stored on a tangible computer-accessible medium and/or in non-transitory form may further be transmitted by transmission media or signals such as electrical, electromagnetic, or digital signals, which may be conveyed via a communication medium such as a network and/or a wireless link, such as may be implemented via network interface 1640.

In one embodiment, I/O interface 1630 may be configured to coordinate I/O traffic between processor 1610, system memory 1620, and any peripheral devices in the device, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. In addition, in some embodiments some or all of the functionality of I/O interface 1630, such as an interface to system memory 1620, may be incorporated directly into processor 1610.

Network interface 1640 may be configured to allow data to be exchanged between computer system 1600 and other devices attached to a network, such as other computer systems, or between nodes of computer system 1600. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, mobile devices, or any other devices suitable for entering or retrieving data by one or more computer system 1600. Multiple input/output devices 1650 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1640.

As shown in FIG. 16, memory 1620 may include program instructions 1625, configured to implement certain embodiments described herein, and data storage 1635, comprising various data accessible by program instructions 1625. In an embodiment, program instructions 1625 may include software elements of embodiments illustrated in the above figures. For example, program instructions 1625 may be implemented in various embodiments using any desired programming language, scripting language, or combination of programming languages and/or scripting languages (e.g., C, C++, C#, JAVA®, JAVASCRIPT®, PERL®, etc.). Data storage 1635 may include data that may be used in these embodiments (e.g., recorded communications, profiles for different modes of operations, etc.). In other embodiments, other or different software elements and data may be included.

A person of ordinary skill in the art will appreciate that computer system 1600 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodi-

The invention claimed is:

1. A method comprising:
transmitting, by a first power line communication (PLC) device, a first beacon frame in a first beacon slot in a first subband;
transmitting, by the first PLC device, a second beacon frame in a second beacon slot in a second subband;
communicating, by the first PLC device, in a first intermediate slot in the first subband to allocate a set of subbands for communicating with a second PLC device;
communicating, by the first PLC device, in a second intermediate slot in the second subband;
transmitting, by the first PLC device to the second PLC device, a poll request in the first subband based on the allocated set of subbands during a poll-based contentions free period (CFP) slot; and
receiving, by the first PLC device from the second PLC device, a data packet in the second subband based on the allocated set of subbands during the poll-based CFP slot.

2. The method of claim 1, further comprising:
in response to receiving the data packet, transmitting, by the first PLC device to the second PLC device, an acknowledgement message in the first subband.

3. The method of claim 1,
wherein the data packet comprises an indication of one or more outstanding data packets, and
wherein the method further comprises receiving, by the first PLC device from the second PLC device, the one or more outstanding data packets in the second subband, during the poll-based CFP slot, after receiving the data packet.

4. The method of claim 3, wherein the poll request indicates a maximum number of packets, and wherein receiving the one or more outstanding data packets is performed within the maximum number of packets.

5. The method of claim 3, wherein receiving the one or more outstanding data packets is performed within a maximum transmission duration.

6. The method of claim 1, further comprising:
wherein communicating in the first intermediate slot in the first subband comprises receiving, by the first PLC device from the second PLC device, a downlink subband report;
wherein communicating in the second intermediate slot in the second subband comprises:
receiving, by the first PLC device from the second PLC device, the downlink subband report; and
transmitting, by the first PLC device to the second PLC device, a subband allocation message, the subband allocation message identifying the first subband for subsequent downlink communications and identifying the second subband for subsequent uplink communications.

7. The method of claim 1, wherein the first intermediate slot and the second intermediate slot are Contention Access Period (CAP) slots during which one multiple PLC devices are allowed to compete for access to a communication medium.

8. The method of claim 7, further comprising:
transmitting, by the first PLC device, data in the first subband during a first CAP slot corresponding to the first subband; and
receiving, by the first PLC device, an acknowledgement message in the second subband during the first CAP slot.

9. The method of claim 7, further comprising:
receiving, by the first PLC device, data in the second subband during a second CAP slot corresponding to the second subband; and
transmitting, by the first PLC device, an acknowledgement message in the first subband during the second CAP slot.

10. The method of claim 1, wherein the first intermediate slot and the second intermediate slot are Discovery Phase (DP) slots, the presence of DP slots indicated in the first beacon frame or the second beacon frame.

11. The method of claim 10, wherein the presence of DP slots implements access control to limit a number of PLC devices capable of joining a network.

12. The method of claim 1, wherein the poll request is for a single device at a single channel only.

13. A power line communication (PLC) device, comprising:
a processor; and
non-transitory computer readable storage medium storing a program for execution by the processor, the program including instructions to:
transmit a first beacon frame in a first beacon slot in a first subband;
transmit a second beacon frame in a second beacon slot in a second subband;
communicate, in a first intermediate slot in the first subband, to allocate a set of subbands for communication with a second PLC device;
communicate, in a second intermediate slot in the second subband, to further allocate the set of subbands for communication with the second PLC device;
transmit a poll request in the first subband based on the allocated set of subbands during a poll-based contentions free period (CFP) slot; and
receive a data packet, from the second PLC device in the second subband based on the allocated set of subbands during the poll-based CFP slot.

14. The PLC device of claim 13, wherein the processor includes a digital signal processor (DSP), an application specific integrated circuit (ASIC), a system-on-chip (SoC) circuit, a field-programmable gate array (FPGA), a microprocessor, or a microcontroller.

15. The PLC device of claim 13, wherein PLC device is a PLC data concentrator or router.

16. The PLC device of claim 13, wherein the poll request is for a single device at a single channel only.

17. The PLC device of claim 13, wherein the PLC device is a medium voltage (MV) device and the second PLC device is a low voltage (LV) device.

18. A method comprising:
receiving, by a first power line communication (PLC) device from a second PLC device, a first beacon frame in a first beacon slot in a first subband;
monitoring, by the first PLC device, for a second beacon frame in a second beacon slot in a second subband;
communicating, by the first PLC device, in a first intermediate slot in the first subband, to allocate the first subband for receiving from the second PLC device;
communicating, by the first PLC device, in a second intermediate slot in the second subband, to allocate the second subband for transmitting to the second PLC device;

receiving, by the first PLC device from the second PLC device, a poll request in the first subband during a poll-based contention free period (CFP) slot; and transmitting, by the first PLC device to the second PLC device, a data packet in the second subband during the poll-based CFP slot, in response to receiving the poll request.

19. The method of claim 18, wherein the first intermediate slot and the second intermediate slot are contention access period (CAP) slots.

20. The method of claim 18, wherein the first intermediate slot and the second intermediate slot are discovery phase (DP) slots.

21. The method of claim 18, further comprising:
inserting an indication of one or more outstanding data packets in the data packet; and
transmitting, by the first PLC device to the second PLC device, the one or more outstanding packets in the second subband, during the poll-based CFP slot.

22. The method of claim 18, further comprising transmitting, by the first PLC device from the second PLC device, an acknowledgement message in the first subband, in response to receiving the data packet.

23. The method of claim 18, further comprising:
creating a downlink subband report, based on the first beacon frame; and wherein communicating in the first intermediate slot comprises transmitting, by the first PLC device to the second PLC device, the downlink subband report in the first intermediate slot; and wherein communicating in the second intermediate slot comprises transmitting, by the first PLC device to the second PLC device, the downlink subband report in the second intermediate slot.

* * * * *